United States Patent [19]
Allison

[11] 4,451,054
[45] May 29, 1984

[54] VEHICLE SUSPENSION SYSTEM

[76] Inventor: William D. Allison, 39 Randor Cir., Grosse Pointe Farms, Mich. 48236

[21] Appl. No.: 377,084

[22] Filed: May 11, 1982

[51] Int. Cl.³ .............................................. B60G 11/08
[52] U.S. Cl. .................................... 280/104; 280/719
[58] Field of Search .............. 280/719, 104, 680, 686, 280/781, 788; 267/47, 48, 52

[56] References Cited

U.S. PATENT DOCUMENTS

| | | | |
|---|---|---|---|
| 2,253,255 | 8/1941 | Weber | 267/47 |
| 2,755,098 | 7/1956 | Jochumsen | 280/719 |
| 3,111,308 | 11/1963 | Wenzel et al. | 267/52 |
| 3,231,291 | 1/1966 | Kozicki et al. | 267/52 |
| 3,525,534 | 8/1970 | Moodler et al. | 280/104 |
| 3,749,389 | 7/1983 | Duchemin | 267/52 |
| 3,917,306 | 11/1975 | Madler et al. | 280/104 |

FOREIGN PATENT DOCUMENTS 1299436 12/1972 United Kingdom ................ 280/724

Primary Examiner—Joseph F. Peters, Jr.
Assistant Examiner—Ross Weaver
Attorney, Agent, or Firm—Fisher, Gerhardt, Crampton & Groh

[57] ABSTRACT

A vehicle suspension system which includes longitudinally extending suspension rails supporting the wheels of the vehicle with the rails being interconnected by a transverse beam and with transversly extending leaf spring assemblies. The leaf spring assemblies also are connected to the body or frame of a vehicle and loads imposed on any one of the wheels is transmitted through the rails, the transverse beam and the leaf spring assemblies to the remaining wheels of the vehicle.

11 Claims, 13 Drawing Figures

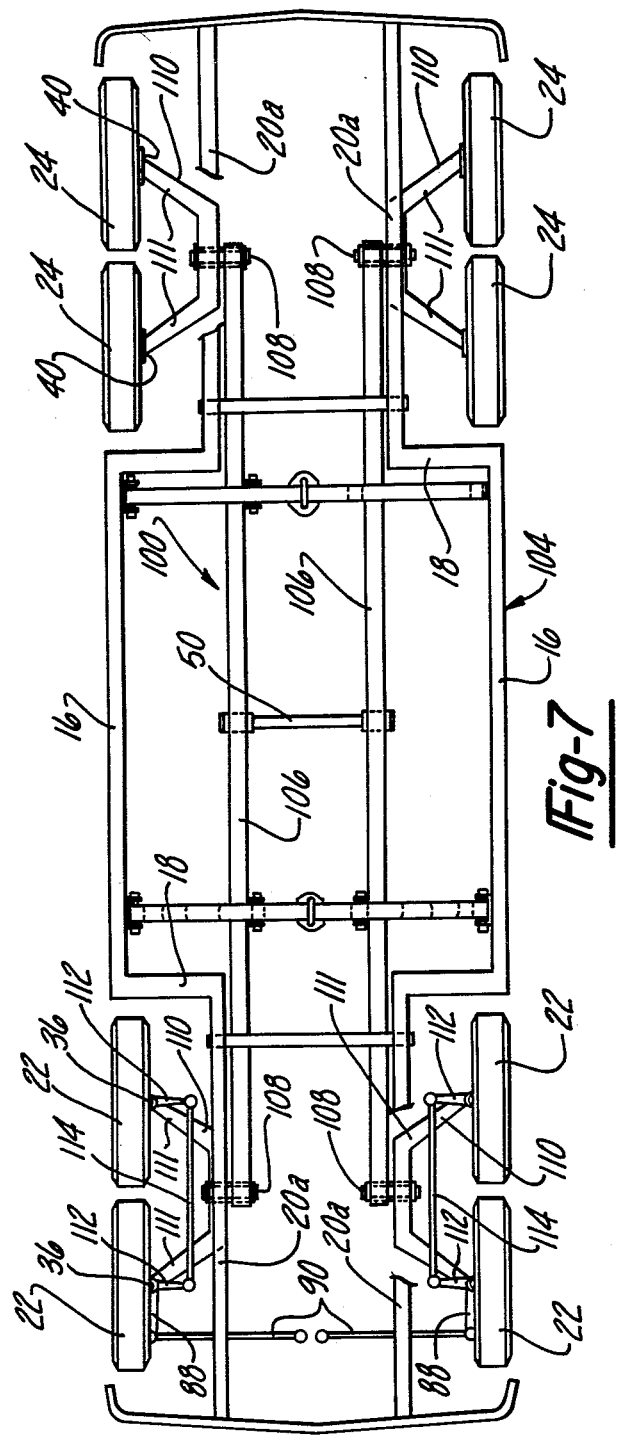
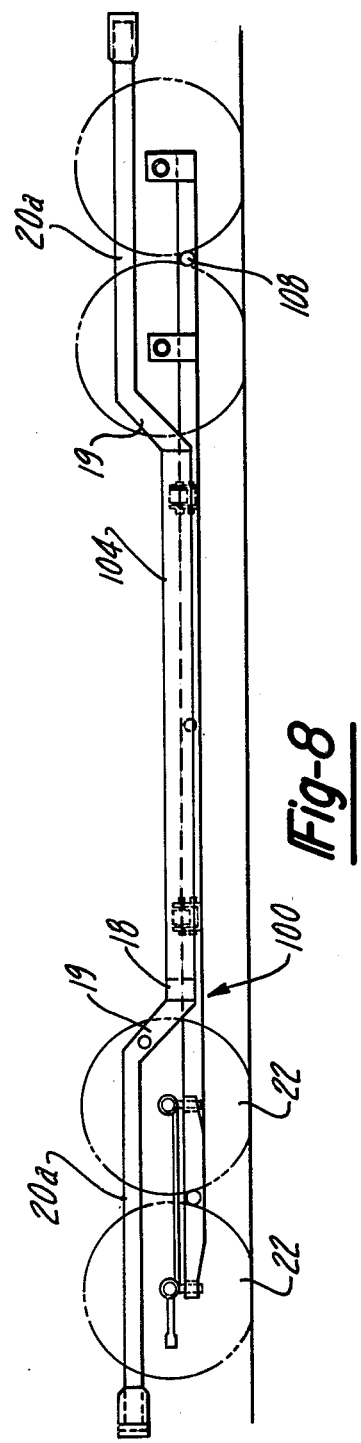

VEHICLE SUSPENSION SYSTEM

This invention relates to suspension systems for wheeled vehicles and more particularly to such systems employing leaf springs.

Present vehicle suspension systems require that the vehicle body be strongly reinforced at numerous points to accept loads transferred by the suspension components with most conventional passenger car suspensions requiring from eighteen to twenty-two such strong points. Additionally, many current vehicles incorporate stub frames associated with each of the wheels to absorb suspension loads thereby further adding to the weight of the sprung portion of the vehicle. Also the form of suspension in conventional vehicles is dependant on the type of drive employed, that is, front or rear wheel drive.

It is an object of the present invention to provide a spring suspension in which all of the wheels of the vehicle are interconnected to afford superior ride characteristics.

Another object of the invention is to provide such an interconnected spring suspension system which is usable with either front or rear wheel drive trains.

Another object of the invention is to provide such a suspension system in which all of the suspension loads from the wheels are transmitted to the body at existing or natural strong points in the body structure.

Yet another object of the invention is to provide the vehicle suspenion system greatly reducing the number of components.

Another object of the invention is to provide a vehicle suspension system making it possible to reduce overall vehicle cost by permitting the use of lighter structures at opposite ends of the passenger cage or compartment such as fenders, hood, and trunk enclosures currently required for crash protection.

Other objects of the invention are a suspension system which will afford superior vehicle handling with increased resistance to lateral skids and superior absorption of noise, vibration and harshness from road induced vibrations.

A still further object of the invention is to provide a suspension system which contributes to occupant protection by crash force absorption at both the front and rear of the vehicle.

The objects of the invention are accomplished by a suspension for wheeled vehicles in which the suspension system includes a pair of rails which extend longitudinally for substantially the full length of the vehicle and are disposed in symmetrically spaced relationship to the center plane of the vehicle. The rails are interconnected by a transverse beam which forms a generally H-shaped structure and the beams are free to pivot relative to the transversly extending axis formed by the transverse beam. The longitudinally extending rails also are connected together by leaf spring assemblies which extend transversly of the vehicle. The leaf spring assemblies are made up of a plurality of leaves with a long main leaf having its opposite ends connected to either the suspension rails or the vehicle body. The spring assembly also includes a short outer leaf which is connected to the other of the body or suspension rails. The ends of the various leaves are connected to the body and suspension rails by means of resilient bushings which permit a slight elongation between the mounting points during flexing of the springs. Road loads imposed on any one of the wheels of the vehicle is transmitted to all of the remaining wheels by means of the leaf spring assemblies and the transverse beam. With the front steerable wheels positioned for the vehicle to move straight ahead, the center planes of all the wheels remain parallel during the change in position of any one wheel so that load and camber of all of the wheels are changed to the same attitude in response to vertical displacement of any one wheel or combination of wheels. This results in a substantial reduction in the spring rates as separate wheels encounter road irregularities as well as reducing the forces transmitted to the sprung mass. The interconnection of the wheels also affords better directional stability on irregular road surfaces.

In one embodiment of the invention the suspension system is applied to a conventional four wheel vehicle, in another embodiment of the invention to a multiple wheel vehicle and in still another embodiment to heavy load bearing vehicles such as truck-tractors.

FIG. 7 is a plan view similar to FIG. 1 of a multi-wheeled vehicle embodying the suspension system of the present invention;

FIG. 8 is a side elevation of the vehicle seen in FIG. 7;

Figure 1:
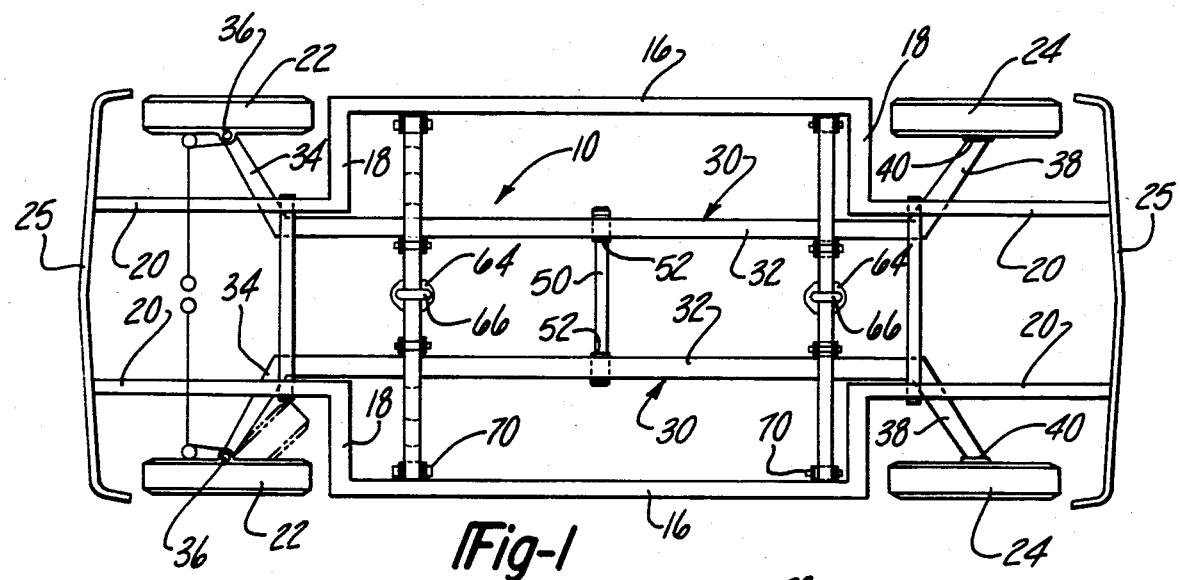
FIG. 1 is a top plan view of a suspension system embodying the inventions shown in association with frame components of a vehicle body.

The suspension system 10 embodying the invention can be incorporated in a vehicle 11 having a body 12 on a frame 14. Although not illustrated, a unitized body can be used in which the frame and body are formed as a unit. In either case, however, the unitized body or the separate body 12 and frame 14 have generally the same configuration relative to the suspension system 10. As illustrated, frame 14 is made up of a pair of generally longitudinally extending side members 16. Opposite ends of the side members 16 have short transversly extending portions 18. From the inner ends of the portions 18 the frame extends upwardly at 19 and forwardly at 20 to afford clearance for front wheels 22. The rearward portion of the frame 14 is generally the same with short inwardly extending portions 18, upwardly extending portions 19 and rearwardly extending frame members 20 which afford clearance for the rear wheels 24. The frame extensions 20 at the forward and rearward end of the frame 14 serve to support forward and rearward bumpers 25.

Figure 2:
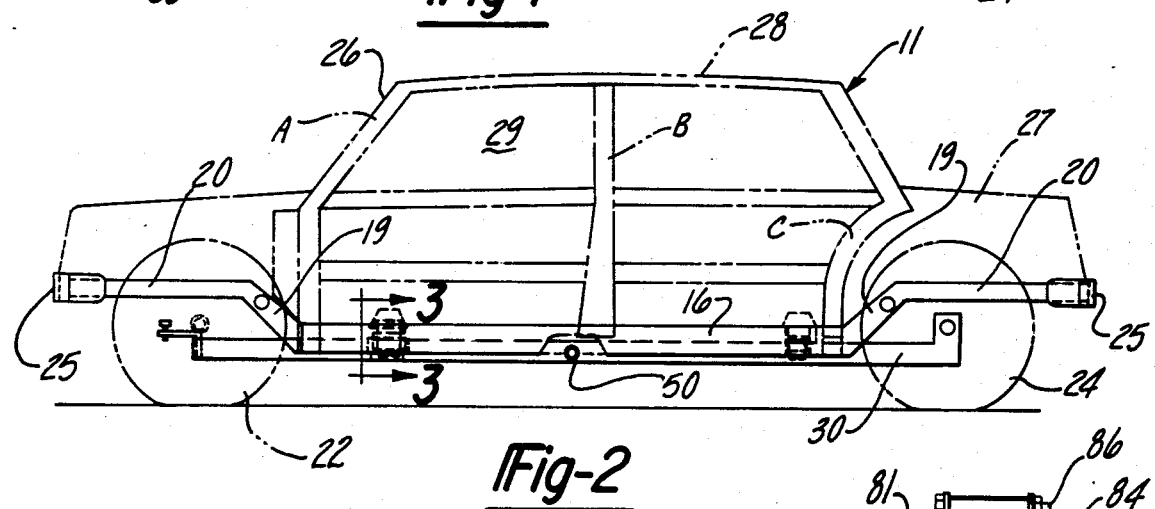
FIG. 2 is a side elevation of a vehicle incorporating the suspension system of FIG. 1.

In a typical vehicle construction as seen in FIG. 2, the forward portions of the longitudinally extending side member 16 support a pair of A pillars extending upwardly to form opposite sides of the windshield 26. Also, a pair of B pillars extend upwardly immediately rearwardly of the front doors and C pillars extend upwardly forwardly of the rear wheels 24 to form a support for a bulkhead for the backrest of the back seat or for the trunk compartment 27. These points typically are reinforced at the wheel or frame level and support the roof 28 of the vehicle. The passenger compartment or passenger cage 29 of the vehicle 11 is disposed between the longitudinally extending side members 16 of the frame 14 with the forward portion being defined in the area of the A pillars and the rearward portion of the compartment being defined at the C pillars.

The suspension 10 includes a pair of elongated beams 30 having long main center portions 32 extending parallel to each other and symmetrically spaced to opposite sides of a vertical center plane of the vehicle 11. At the forward end of the center portions 32 the beams 30 have forward beam extensions 34 which angle outwardly with the outer ends providing supports for the steering king pins 36 for the front wheels 22. The rear ends of the suspension beams 30 are in the form of beam extensions 38 which angle outwardly in opposite directions and are provided with a plate-like bracket 40 supporting the axles for the rear wheels 24 and the associate brake backing plates (not shown).

Figure 6:
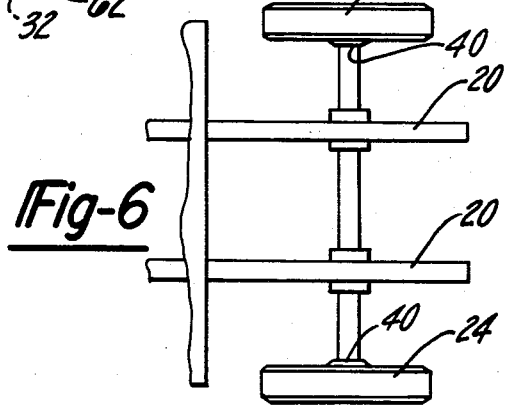
FIG. 6 is a view of a portion of a vehicle with a beam axle embodying the principles of the invention.

If the suspension system 10 is to be used with solid or beam axles 42 as seen in FIG. 6 extending transversly of the vehicle, the center beam sections 32 of the elongated beams 30 can be extended at 44 to pass under the axles 42. The extensions 44 can be attached to the axle 42 with rubber bushings 46 to absorb driving and braking torque.

At or near the midpoint of the wheel base the center portions 32 of the elongated beams 30 are interconnected by a transversly extending bar or tube 50 having its opposite ends journaled for rotation in bearing sleeves 52 passing through each rail portion 32. This construction maintains the beams 30 in spaced apart relationship to each other and permits the longitudinal center portions 32 of the rails to pivot in planes parallel to each other and perpendicular to the axis of the beam 50.

The unsprung portion of the vehicle 12 which includes the beams 30, the transverse beam or tube 50 and the front wheels 22 and rear wheels 44 are supported or sprung relative to the body 14 by a pair of leaf springs 54 and 56, although the springs 54 and 56 can be considered as making up a part of each of the sprung and unsprung portions. The leaf springs 54 and 56 extend transversly and each leaf spring assembly 54 or 56 includes a long main leaf 58 and a short outer leaf 60 which are separated by the desired number of leaves 62, each shorter than its adjacent leaf in accordance with conventional leaf spring practice.

In conventional leaf spring design it is usual to use a center bolt to maintain the multiple leaves in assembled condition. In this instance however, the leaves are held in stacked relationship to each other by interlocking bends as indicated at 63 in FIG. 3. The interlocking bends 63 are further held relative to each other by a straddle mounted clip 64 held in position by a U-bolt 66 seen in FIG. 1.

Figure 4:
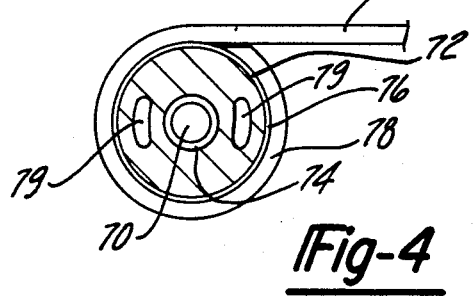
FIG. 4 is a view at an enlarged scale of one portion of the spring assembly seen in FIG. 3.

The outer ends of the long main leaf 58 are secured to spring attaching brackets 68 fixed on the inner wall of the rocker panels or side members 16. The brackets receive a bolt 70 which passes through a voided bushing 72 seen in FIG. 4. The voided bushing 72 includes an inner sleeve 74 which receives the mounting bolt 70 and has an outer sleeve 76 which is seated in the eye 78 formed at each of the outer ends of the long main leaf 58. The inner and outer sleeves 74, 76 are separated by a resilient member having voids 70 which permit limited lateral deflection within the bushing to accomodate change in spacing between the ends of the spring assemblies 54 and 56 during flexing.

Figure 3:
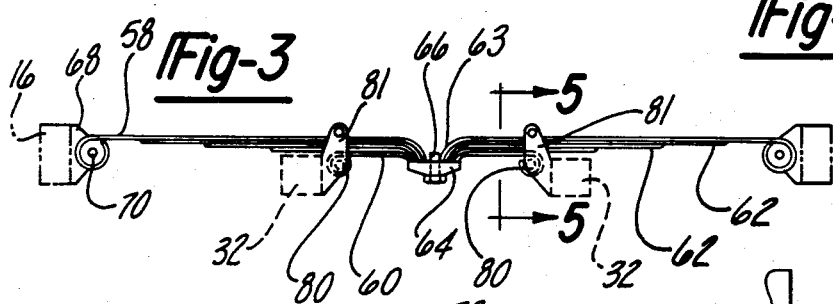
FIG. 3 is a view taken generally on line 3—3 in FIG. 2.
Figure 5:
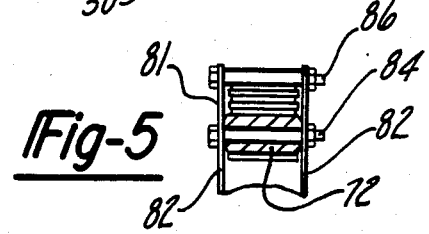
FIG. 5 is a cross-sectional view taken on line 5—5 in FIG. 3.

The outer ends of the short outer leaf 60 of each of the leaf spring assemblies 54 and 45 are formed with eyes 80 which receive bushing assemblies 72. The eyes 80 and the bushings 72 are supported by means of brackets 81 formed on the inner sides of the long center portions 32 of the elongated beams 30 as seen in FIGS. 3 and 5. The brackets 81 each include a pair of plates 82 fixed to the beam portion 32 to receive a bolt 84 which passes through the bushing assemblies 72. The side plates 82 also serve to support a bolt 86 extending parallel to the bolts 84 and engageable with the top surface of the upper main leaves 58. During bounce and jounce the multiple leaves of the spring assemblies 54 and 56 are confined between the bolts 84 and 86.

As seen in FIGS. 1 and 2 the leaf spring assemblies 54 and 56 are spaced in opposite directions forwardly and rearwardly of the transverse tube beam 50. Also the transversly extending leaf spring assemblies 54 and 56 have their outer ends connected to points on the outer rocker panel or side member 16 of the frame 14 which are close to the A and C pillars. These areas of the vehicle body are typically already strongly reinforced to sustain the various body loads.

The suspension arrangement described thus far interconnects the front and rear wheels through the H-shaped spring support assembly formed by the elongated beams 30 and the transverse beam 50 and results in an interconnected spring suspension as opposed to a so-called independent spring suspension. For example, when one of the front wheels 22 is raised relative to the body 14 to a jounce position, the associated longitudinal rail 30 also moves upwardly and increases the lift on the ends of both the spring assemblies 54 and 56 associated with that side of the vehicle. At the same time that the front wheel moves upwardly to a jounce position the transverse bar 50 is tilted in a transverse vertical plane to the mean position established by the wheel elevation of all four of the wheels. With the front wheels positioned straight ahead, the center planes of all the wheels remain parallel. As a result, both load and camber of all wheels are changed to the same attitude in response to vertical displacement of any one of the wheels. This arrangement results in a substantial reduction in spring rates for individual wheel bumps, less tendency to induce pitch and lowers the forces transmitted to the sprung mass. Also, the interconnection of the wheels affords better directional stability on undulating road surfaces.

Aside from the ride characteristics which are improved by the present suspension system, the construction provides additional channels for barrier crash energy absorption. For example, on impact, the bumpers 25 are driven into the wheels 22 or 24 displacing them rearwardly or forwardly by bending the extensions 34 or 38 relative to the parallel center portions 32 of the elongated beams 30. This is in addition to the forward and rearward frame portions 20 of the frame 14 which are conventionally provided and which afford controlled energy absorption.

As illustrated in FIGS. 1 and 2 the front steerable wheels 22 can be controlled by forwardly extending arms 88 and tie rods 90 as illustrated. Alternatively, if desired, the suspension system lends itself to having the arms 88 and tie rods 90 disposed rearwardly of the axis of rotation of the wheels.

The suspension system 10 also lends itself to the use of either a forward wheel drive or rearward wheel drive arrangement without requiring any modification of the suspension system.

Referring now to FIGS. 7 and 8 a suspension system 100 is illustrated in connection with a vehicle 102 employing two pairs of steerable front wheels 22 and two pairs of rear wheels 24. The vehicle 102 has a vehicle frame 104 which is similar to the frame 14 seen in FIG. 1 except that the forward and rearward frame extensions 20a in FIG. 7 are longer than the forward and rearward extensions 20 in FIG. 1 in order to accomodate the additional wheels 22 and 24. In other respects the frame 104 is identical to the frame 14 in that it employs side members 16, short transverse extensions 18 and upward extensions 19.

The suspension system 100 differs from the suspension system 10 in that parallel beams or rails 106 are longer than the center beam portion 32. The ends of the beams 106 are provided with oppositely extending transverse pivot pins 108. The forward pivot pins 108 each support rocker assemblies 110 at opposite sides of the vehicle. Each of the rocker assemblies 110 includes a pair of diverging arms 111 the ends of which support a pair of forward wheels 22 disposed in longitudinally aligned relationship to each other at one side of the frame 104. Each pair of the steerable wheels 22 at one side of the vehicle is interconnected by a parallel linkage arrangement which includes a pair of parallel arms 112 linked together by a tie bar 114 which maintains the wheels 22 parallel to each other during steering movement about the king pins 36. The two pairs of wheels 22 at opposite sides of the vehicle 102 are linked together in the same manner as in the prior embodiment of the invention by means of steering arms 88 and tie rods 90.

The rear ends of the beams 106 also are provided with rocker or walking beam assemblies 110 for the pairs of rear wheels 24 at opposite sides and at the rear of the vehicle. The rear rocker assemblies 110 are provided with diverging arms 111, the outer ends of which are provided with plate brackets 40 for supporting the axles of the rear wheels 24 together with brake backing plates as in the prior embodiment of the invention. During movement of the vehicle 102 the rocker assemblies 110 at the forward and rearward ends of the suspension system 100 are free to oscillate about the pivot pins 108.

The beams 106 are linked together by a transverse beam or tube 50 in the same manner as in the case of the suspension system 10. Also forward and rearward leaf spring assemblies 54 and 56 are connected to the frame 104 and to the beams 106 in the same manner as with the suspension system 10.

The suspension system 100 operates the same as the suspension system 10 except that the vehicle load is distributed between additional wheels which serves to further minimize vibration, and transmittal of loads due to road surface variations to the walking beam assemblies 110 and from the assemblies to the longitudinally extending beams 106.

As with the suspension system 10, the suspension system 100 forms an interconnected spring suspension as opposed to an independent spring suspension. As with the prior embodiment when one of the front wheels 22 raises up relative to the frame 104 to a jounce position the associated rocker assembly 110 pivots about the associated pin 108 to raise that portion of the associated longitudinal beam 106. This upward movement of a portion of the rail 106 also increases the lift on the ends of both of the spring assemblies 54 and 56 associated with that side of the vehicle 102. Simultaneously the transverse bar 50 is tilted in a transverse vertical plane to a mean position established by the wheel elevation of all eight wheels. With the pairs of front wheels 22 positioned straight ahead, the center planes of all eight wheels remain parallel so that both load and camber are changed on all wheels in response to vertical displacement of any one of the eight wheels. This arrangement results in a large reduction in spring rates for individual wheel bumps and substantially lowers the forces transmitted to the sprung mass of the vehicles. Also the interconnection of all of the wheels to the suspension system affords better directional stability on irregular road surfaces.

In addition to the improvement in ride characteristics, the suspension system 100 provides additional and longer channels for barrier crash energy absorption.

The multiple wheel arrangement employed with the suspension system 100 makes it possible to support additional loads such as might occur due to the use of storage batteries in electrically driven or hybrid vehicles. Also the multiple wheel arrangement makes it possible to use conventional vehicle bodies with conventional passenger cages as illustrated in FIG. 2 or special bodies such as those used with motor homes or buses.

Figure 13:
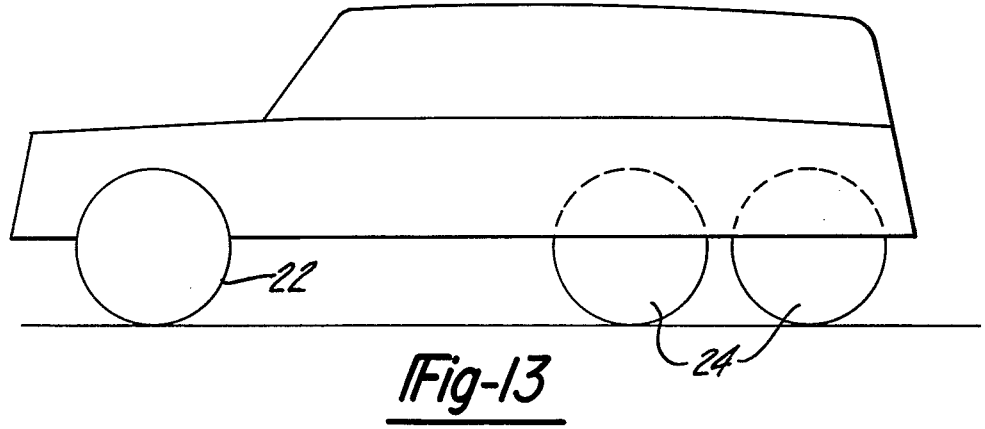
FIG. 13 is a side elevation of another form of vehicle having tandem rear wheels as in FIGS. 7 and 8 and front wheels as in FIG. 1 and 2 for use with the suspension system of the present invention.

Referring now to FIG. 13 the suspension systems 10 illustrated in connection with FIG. 1 and the suspension system 100 illustrated in connection with FIG. 6 can be combined to result in a six-wheeled vehicle 116. In such a vehicle, a single pair of front steerable wheels 22 can be supported as seen in FIG. 1 and two pairs of rear wheels 24 can be supported as seen in FIG. 6. The advantages of such a suspension system are similar to those of the suspension system 10 and 100 and the use of the multiple rear wheels makes it possible to carry larger rear end loads such as those incurred with pick-up trucks, recreational vehicles and vehicles employing a large weight in storage batteries for electrical drives.

Common to both the suspension system 10 and 100 are the longitudinally extending rails joined together by the transversly extending beam or tube 50 and the leaf springs 54 and 56 which also extend transversly of the longitudinal line of the vehicle. These same basic components are employed in still another suspension system 130 adapted for use with truck-tractors which are required to move and support extremely large loads.

Referring to FIGS. 9 through 12, a truck-tractor suspension system 130 is illustrated in connection with a frame 132 includes a pair of longitudinally extending members 134 which are disposed in parallel relationship to each other and have a relatively high ground clearance as compared with frame members of a passenger vehicle.

The usual truck frame 132 is supported relative to front steerable wheels 136 and a rear wheel and axle 138 which includes tandem beam axles 140 and dual rear wheels 142 by means of the suspension system 130. The suspension system 130 includes a pair of parallel suspension beams 144. The beams 144 support the wheels 136 and 142 in a manner to be described and are maintained in substantially parallel relationship to each other, at least in part, by transversly extending leaf spring assemblies located in desired load bearing areas. For example, as viewed in FIG. 9, one transverse leaf spring assembly 146 is disposed immediately rearwardly of the front wheels 136, a leaf spring assembly 148 is located immediately ahead of a forward one of the rear axles 140 and still another leaf spring assembly 140 is disposed at the rear end of the frame 132 and to the rear of the rear tandem axle 140.

Figure 9:
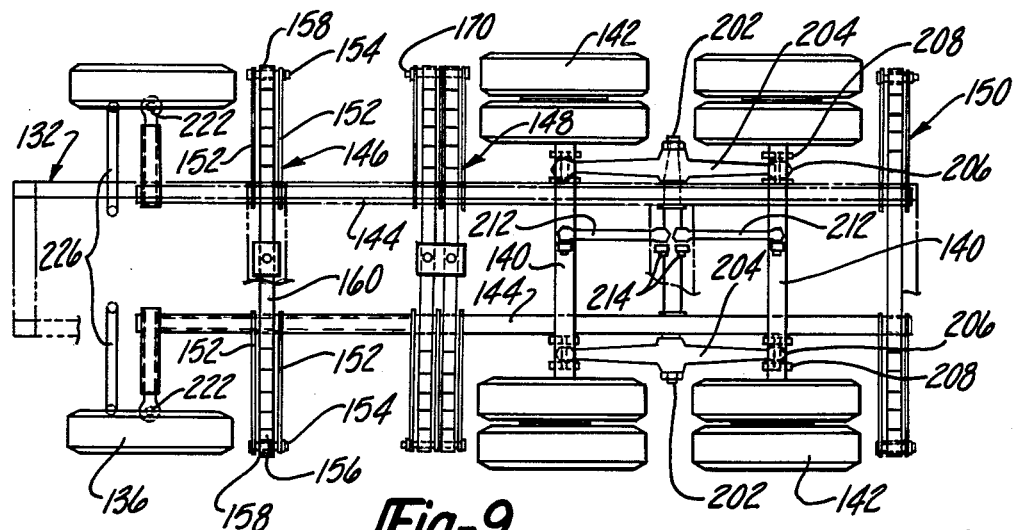
FIG. 9 is a plan view of a truck-tractor vehicle with a modified form of the suspension system embodying the invention.
Figure 10:
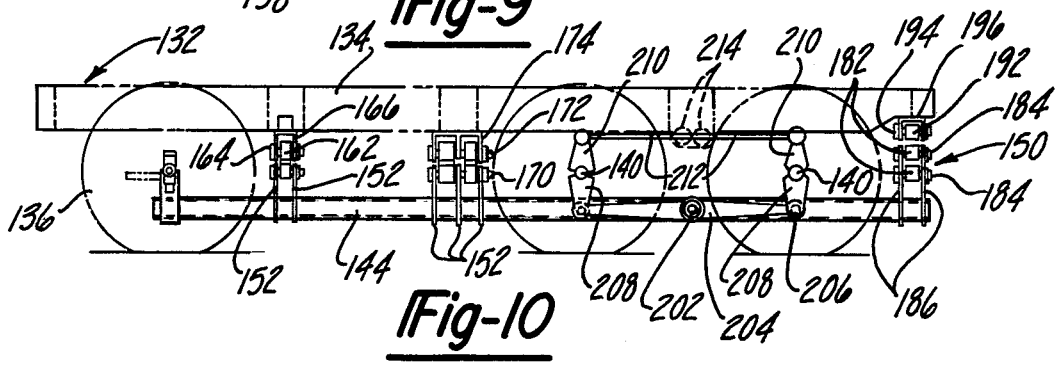
FIG. 10 is a side elevation of the vehicle and suspension system seen in FIG. 9.

The construction by which the leaf spring assemblies 146, 148, 150 are interconnected between the suspension beams 144 and the frame 132 can best be understood in connection with the mounting of the front leaf spring assembly 146 as seen in FIGS. 9 and 10.

The spring mounting for the transverse leaf spring assembly 146 includes a pair of parallel transversly extending bracket arms 152 having their inboard ends rigidly connected to the associated one of the pair of longitudinally extending suspension rails 144. The bracket arms 152 extend upwardly and outwardly toward the outer edge of the vehicle and provide support for a mounting bolt 154. The leaf spring assembly 146 includes a long master leaf 156 at the bottom of the assembly the opposite ends of which are provided with eyes 158 to receive a bushing 72 of the type seen in FIG. 4. The bushings 72 in the eyes 158 receive the mounting bolts 154 to support the spring assembly 146 relative to the suspension beams 144. The leaf spring assembly 146 also includes a short leaf 160 at the top of the assembly. The opposite ends of the short leaf 160 are provided with eyes 162 to receive bushing 72 of the type seen in FIG. 4 and mounting bolts 164. The bolts 164 are supported by brackets 166 rigidly fastened to the underside of the longitudinally extending frame members 132 as seen in FIG. 10.

The intermediate leaf spring assembly 148 can include a pair of leaf spring assemblies 168 each of which is identical to the front leaf spring assembly 146. The pair of leaf spring assemblies 168 are disposed parallel to each other and transversly of the vehicle between the frame 132 and the suspension beams 144 in much the same manner as the leaf spring assembly 146. Three bracket arms 152 extend parallel to each other from each of the suspension beams 144 and receive a long bolt 170 which passes through aligned eyes 162 in a bracket member 174 rigidly fastened to the underside of the longitudinal frame members 134 as seen in FIG. 9.

Figure 11:
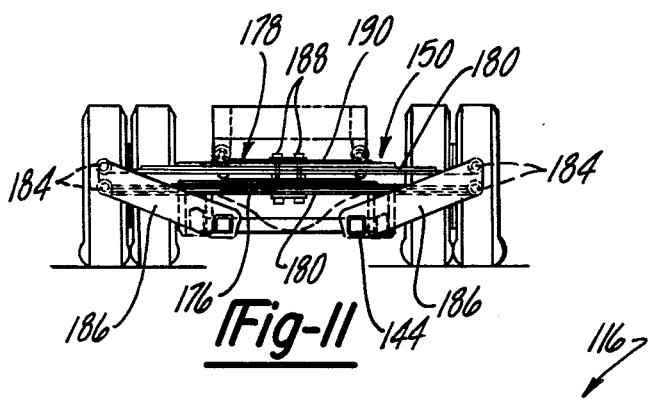
FIG. 11 is an end elevation taken from the right end in FIG. 9.

FIG. 11 illustrates still another form of leaf spring assembly 150 at the extreme rear of the vehicle. The leaf spring assembly 150 includes a lower spring subassembly 176 and an upper spring subassembly 178. Each of the subassemblies 176 and 178 includes a long main or master leaf 180. The opposite ends of each of the master leaves 180 are provided with eyes which receive voided bushing 72 of the type described in connection with FIG. 4. The bushings and eyes 182 (FIG. 10) also receive bolts 184 which are so arranged that a pair of bolts 184 are disposed at each side of the vehicle and are supported in that position by bracket arms 186 substantially the same as bracket arms 152. The spring subassemblies 176 and 178 are fastened together by a bracket assembly including bolts 188 and the upper spring subassembly 178 is provided with a short leaf 190, the opposite ends of which are provided with eyes 192. The eyes 192 receive bushings 72 of the type seen in FIG. 4 and mounting bolts 194 held in position by mounting brackets 196 at the underside of the longitudinal members 134 of the frame 132.

In addition to the leaf spring assemblies 146, 148 and 150, the longitudinally extending suspension beams 144 are maintained in substantially parallel relationship to each other by a transverse beam or tube 200 which is generally similar to the transverse beam 50 described in connection with the prior embodiments. In this instance, however, the transverse beam 200 is journaled for rotation in the suspension beams 144 and projects outwardly from each of the suspension beams 144 to provide pivots 202 for walking beams 204. The walking beams 204 extend forwardly and rearwardly from the pivot 202 and have their ends connected by means of universal joints 206 supported by pairs of bracket arms 208 depending from each of the tandem beam axles 140. Braking and driving torque occuring at the rotational axis of the rear wheels 142 is absorbed through a link assembly which includes an upwardly extending arm 210 associated with each of the beam axles 140. The arms 210 are each connected at their upper end by way of a line 212 to adjacent pivot points 214 as seen in FIGS. 9 and 10 on the truck-tractor frame 132.

Figure 12:
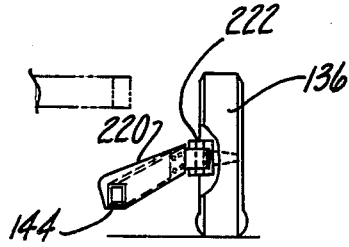
FIG. 12 is a view taken in the direction of line 12—12 in FIG. 9.

The forward ends of the suspension beams 144 support the steerable front wheels 136 by means of arms 220 which extend outwardly and upwardly as seen in FIG. 12. The outer ends of the arms are provided with king pins 222 forming the steering axis for the wheels. The wheels 136 are steered in unison through means of steering arms connected to a conventional steering system (not shown) by tie bars 226.

The suspension rails 144 and the transverse beam 200 form a generally H-shaped suspension arrangement interconnected to the frame 132 of the truck-tractor by means of transversly extending leaf spring assemblies 146, 148, and 150. The elevation of any one of the wheels results in transmittal of the loads through the transverse bar or beam 200 and the various leaf spring assemblies 146, 148, and 150 to the remaining wheels of the vehicle. The operation of the suspension system is substantially the same as the prior disclosed embodiments of the invention.

A suspension system for the body of wheeled vehicles has been provided employing longitudinally extending beams which support the wheels with transversly extending leaf spring assemblies interposed between the rails and the vehicle body. The rails also are interconnected by a transversly extending beam so that loads imposed on any one wheel are transferred through the beams and spring assemblies to the other wheels and so that the change in attitude of any one wheel results in a similar change in attitude but to a lesser degree in the remaining wheels. The suspension system is adaptable for use with front or rear wheel drive vehicles, vehicles with four or more wheels and with motor vehicles of all forms including passenger cars, buses, trucks and recreational vehicles.

The embodiments of the invention in which an exclusive property or privilege is claimed are defined as follows:

1. A suspension system for the body of a wheeled vehicle comprising: a pair of elongated longitudinally extending and spaced apart rails, said pair of rails each supporting ground engaging wheels at opposite ends, a transverse beam having opposite ends supported relative to said rails for oscillation of said rails about the axis of said transverse beam separately of each other, leaf spring means extending transversely of and having end parts extending outwardly of said rails, means connecting spaced portions intermediate of the ends of said leaf spring means to said rails, additional means connecting opposite ends of said spring means to opposite sides of said body whereby ground engaging loads and movement imposed on said wheels at one end of one of said rails is transmitted to wheels at the other end of said one of said rails and through said leaf spring means and said transverse beam to the wheels associated with said other rail, said wheels being simultaneously moveable in substantially parallel planes in response to displacement of any one of said wheels and said body being resiliently supported relative to said rails by said end parts of said leaf spring means.

2. The suspension system of claim 1 wherein said leaf spring means comprise leaf spring assemblies longitudinally spaced from each other.

3. The suspension system of claim 2 wherein said pair of leaf springs are disposed between said wheels disposed at opposite ends of said rails.

4. A suspension system of claim 1 wherein rails oscillate about said transverse beam in generally parallel vertical planes.

5. The suspension system of claim 4 wherein said transversely extending beam is disposed at a point substantially midway between said wheels.

6. The suspension system of claim 1 wherein a pair of wheels are supported adjacent each end of each one of said beams.

7. The suspension system of claim 6 wherein said pairs of wheels are supported by walking beam assemblies pivotally connected to said rails.

8. The suspension system of claim 1 wherein said means connecting said leaf spring means to said body and said beams include resilient bushing assemblies.

9. A suspension system for a vehicle comprising: an unsprung portion including forward and rearward pairs of ground engaging wheels, a pair of elongated longitudinally extending and spaced apart rails each supporting a forward and rear ground engaging wheel at opposite ends thereof, said rails being disposed between said pairs of wheels and below the upper level of said wheels, and a transverse beam having opposite ends pivotally supported relative to said rails for osillation of said rails separately of each other about the axis of said transverse beam, a sprung portion in the form of a body having opposite side portions between forward and rearward wheels and substantially coextensive with the outer edges of wheels that are associated with each one of said rails and below the upper level of said wheels, leaf spring means operatively disposed between said sprung and unsprung portions and comprising a pair of leaf springs extending substantially horizontally and transversely of both of said rails and said body, means connecting each of said leaf spring means to said rails inboard of said body, and additional means connecting opposite ends of said leaf spring means to opposite side portions of said body whereby ground engaging loads and movement imposed on any one of said wheels is transmitted to the other wheels through said rails, said spring means and said beam and wherein said sprung portion is supported from said unsprung portion by the portions of said springs between said rails and said side portions of said body.

10. The suspension system of claim 9 wherein said means connecting said leaf spring means to said rails include a bracket connected to said rail and means engaging the underside and top of said spring means to confine the latter against vertical movement.

11. The suspension system of claim 9 wherein opposite ends of said rails are provided with beam extensions extending outwardly at an angle to said beams and to each other and said pairs of wheels are supported to the outer ends of said beam extentions.

* * * * *